(12) United States Patent
Honda (10) Patent No.: US 6,369,852 B1
(45) Date of Patent: Apr. 9, 2002

(54) ANALYTICAL SYSTEM FOR MOVING PICTURE REGENERATION

(75) Inventor: Yoshizou Honda, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/405,697

(22) Filed: Sep. 24, 1999

(30) Foreign Application Priority Data

Sep. 29, 1998 (JP) .......................................... 10-276177

(51) Int. Cl.$^7$ ........................... H04N 17/00; H04N 5/44
(52) U.S. Cl. ........................ 348/192; 348/553; 348/559
(58) Field of Search ................................ 348/559, 563, 348/553, 192, 193; 382/284; H04N 17/00, 5/44

(56) References Cited

FOREIGN PATENT DOCUMENTS

JP          11-69325          3/1999

OTHER PUBLICATIONS

MPEG–4 publication, "Current Activity in MPEG–4 Video", Hirohisa Jozawa, Mar. 1997 (8 pgs.).
NHK publication, "A study a bit allocation method based on rate–distortion properties for different coded picture types", Osamu Mizuno, et al., Apr. 1998 (8 pgs.).
ATM publication, "Issues on high presense video communication over international ATM networks", Takahiro Komine, et al., Jul. 1998 (6 pgs.).
Japanese language publication regarding image quality deterioration owing to coding and evaluation coding system (technical information about SNR of image which is an extract of "bandwidth compression of image and coding technique"), 1994 (4 pgs.).

Primary Examiner—Sherrie Hsia
(74) Attorney, Agent, or Firm—Flynn, Thiel, Boutell & Tanis, P.C.

(57) ABSTRACT

An analytical system for moving picture regeneration is capable of ascertaining an appropriate method of improving the quality of a moving picture by executing satisfactory analysis of the state of moving picture regeneration. With the analytical system for moving picture regeneration, moving picture codes are decoded and regenerated by respective regeneration units. Thereupon, in each of the regeneration units, occurrence of picture freeze is detected by information subunits for picture freeze occurrence, a throughput is detected by throughput monitoring subunits, and delay in input time of the respective moving picture codes is detected by input-time information subunits and sent out to a display unit. Further, a SNR value is computed on the basis of a restored moving picture and a reference moving picture by respective SNR computation units, and a sum of the throughputs of the respective regeneration units is obtained by a total throughput monitoring unit, and sent out to the display unit. As a result, the state of the occurrence of the picture freeze and the SNR, for respective pictures, are detected and displayed concurrently, and also fluctuations in the input delay time and the throughputs for decoding are detected and displayed. Furthermore, a total throughput of constituent units having processing resources in common is detected and displayed.

5 Claims, 4 Drawing Sheets

ANALYTICAL SYSTEM FOR MOVING PICTURE REGENERATION

BACKGROUND OF THE INVENTION

1. Field of the Invention

The present invention relates to an analytical system for moving picture regeneration, and more particularly, to an analytical system for evaluation of a regeneration unit for regenerating digital data of a moving picture.

2. Description of the Related Art

Following an advance in enhancement of the processing speed of computers, fast transmission via a network, and enlargement in the capacity of memory media, a practice of regenerating a digital moving picture and utilizing the same has been in widespread use. The digital moving picture is made up of a sequence of instantaneous images, called frames, and each of the frames consists of digital data representing both color and brightness of each of a multitude of points, called pixels or dots, that are obtained by subdividing a picture on a display unit in grid-like fashion.

About 10 to 20 or more frames per second are needed to enable the human visual system to perceive smoothness in variation of images, and about 50,000 to 100,000 or more of dots are needed within a picture in rectangular form to obtain resolution comparable to that of a moving picture broadcast by the conventional television system or the like while tones on the order of about 200 are needed to enable the human visual system to have a feeling of natural tone appearing on a conventional display unit. In the case of full-colorimages, such moving picture data as above are required for each of the three primary colors. In this case, information throughput amounts to about 10 to 100 Mbits or more per second. Accordingly, information throughput of moving picture contents for about 30 minute duration amounts to from 50 to 500 Mbytes, which is quite massive in comparison with audio data, document data, and so forth.

Consequently, a bit stream obtained by compressing the information throughput, called moving picture code, is employed for the moving picture data, and the moving picture codes are used in communications media and memory media. More specifically, the dot data of images generated by a camera and the like are compressed by a unit called a moving picture code encoder (hereinafter referred to simply as an encoder), thereby generating once the moving picture codes, which are then stored in the memory media by use of a semiconductor memory, a fixed disk unit, an optical disk unit, a magnetic tape storage, and so forth. Or the moving picture codes obtained are transmitted via communications media such as telephone circuits, a local area network (otherwise called LAN), and so forth.

On the other hand, for viewing an original moving picture by use of the memory media in which the moving picture data are stored, use is made of a unit for fetching the moving picture codes out of the memory media, and a decoding and regenerating unit (hereinafter referred to simply as a regeneration unit) for decoding the moving picture codes into original dot data and displaying the same on the display unit. Meanwhile, for viewing the original moving picture upon receiving the moving picture data transmitted via communications media, use is made of a receiver for receiving the moving picture data, and a decoding and regenerating unit (hereinafter referred to also simply as a regeneration unit), the same as described above, for decoding the moving picture codes into the original dot data and displaying the same on the display unit.

There are international standards for moving picture coding systems, for example, MEPG-1 (ISO/IEC01172), MEPG-2 (ISO/IEC 13818), and MEPG-4 (ISO/IEC 14496), in accordance with International Organization for Standardization (ISO) as well as International Electrotechnical Commission (IEC), and H261, H263, and so forth recommended by International Telecommunication Union (ITU). With these systems, a compression ratio of information is typically on the order of 1/5 to 1/50 in terms of a ratio of data throughput after data compression to that before data compression.

With the moving picture coding systems described above, the magnitude of a code amount of respective moving picture codes obtained from the dot data of the same moving picture can be rendered variable. For example, in any of the moving picture coding systems described above, coding is performed by use of a frequency component value of tone values in spatial distribution, called DCT (Discrete Cosine Transform) factor, thereby effecting coding by selecting a quantization (digital coding) step width (coarseness), (hereinafter referred to simply as quantization step width), of the DCT factor from among steps in number ranging from several tens to several hundreds. In this case, the code amount per a unit time is called a coding rate, and the coarser the quantization step width is rendered, the lower the coding rate becomes while conversely, the finer the quantization step width is rendered, the higher the coding rate becomes. That is, as the compression ratio undergoes changes depending on the quantization step width, the compression ratio is rendered variable by effecting coding through selection of the quantization step width. Since the DCT factor represents a spatial frequency component value, a difference between a decoded image and an original image becomes wider by rendering the quantization step width coarser (that is, by raising the compression ratio), and conversely, rendering of the quantization step width finer (that is, lowering of the compression ratio) is equivalent to bringing of the decoded image closer to the original image as faithfully as possible.

An increase in difference of the decoded image from the original image, caused by raising the compression ratio as described above, is called degradation in the quality of the moving picture due to compression. Such degradation can be converted into numbers as follows. First, a differential image composed of pixels obtained by deducting the tone value of respective pixels of a restored image from that of respective pixels of the original image, corresponding to the respective pixels of the restored image, is found. Subsequently, a ratio of the root mean square of the tone value of respective pixels of the differential image against the root mean square of the tone value of the respective pixels of the original image is found This ratio is referred to as a SNR (abbreviation of Signal to Noise Ratio), and used as the degradation described above as converted in numbers. Or the logarithm to the base 10 of the ratio, multiplied by a factor of 10, that is, a value expressed in terms of dB (decibel) is often used. Otherwise, there are cases where in place of the root mean square of the tone value of the respective pixels of the original image, use is made of degradation converted into numbers by use of the square of the maximum amplitude that the tone of the original image can have, specifically called a PSNR (Peak SNR).

In this connection, the differential image used in such conversion is taken as noise caused by data compression. Accordingly, it is defined that the larger the noise, the smaller the SNR is, and the smaller the noise, the larger the SNR is.

Analytical evaluation by use of the SNR is applied to the following as well in addition to the evaluation of the degradation due to data compression. That is, it is applied to evaluation of degradation in picture quality, caused by a transmission error during transmission of the moving picture-codes from communications media and memory media. In case of a transmission error occurring to only a part of the moving picture codes, there will be generated spots where decoding can not be effected in other parts thereof either. An extent to which such an effect ripples through is dependent on either the type of codes to which the transmission error has occurred or the precise mode of coding. The transmission error even by 1 bit can result in inability of decoding in a region covering pixels in number ranging from several tens to several hundreds, or in outputting incorrect tone values decoded.

There is also a method of displaying a picture to cope with such a situation as described above, whereby an emergency repair is provided by copying images in corresponding positions of a preceding frame and posting the same to a frame so as to suppress a feeling of unnaturalness that a user viewing the display unit will have. This is a method called concealment, one of countermeasures adopted when a transmission error occurs.

The SNR is used for the evaluation of the effect of such degradation in images as caused by the transmission error, and degradation due to date compression.

An example of the related art dealing with the evaluation of the degradation due to data compression using the SNR is described in the paper under the title: "A Study of Bit Allocation Based on Rate-Distortion Properties for Different Coded Picture Types" by Osamu Mizuno, Yoshiaki Shikakui, Yuji Nojiri, and Yoshimichi Ohtsuka (NHK Broadcasting Techniques Laboratory), Technical Report of IEICE, IE 98-1, pp. 1–8, 1998, published by the Institute of Electronics, Information and Communication Engineers.

Figure 4:
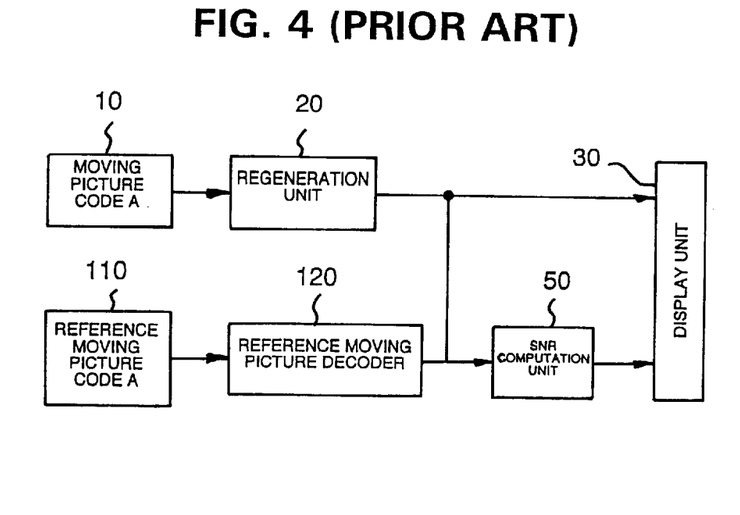
FIG. 4 is a block diagram showing an example of the configuration of a conventional moving picture regeneration analyzer using a SNR.

FIG. 4 shows an example of the configuration of a conventional moving picture regeneration analyzer using the SNR. With the moving picture regeneration analyzer, a moving picture code 10 is decoded by a regeneration unit 20, and a reference moving picture code 110 is decoded by a reference moving picture decoder 120. An output image from the regeneration unit 20 and an output image from the reference moving picture decoder 120 are sent out to a SNR computation unit 50. The SNR computation unit 50 fetches differentials between the tone value of respective pixels of these two output images delivered thereto, corresponding to each other, to compute the root mean square of the differentials, and at the same time, computes the root mean square of the tone values of a reference moving picture before computing a ratio between both the root mean squares, or converting the ratio into a dB value. Such computation of the SNR is executed, for example, for respective frames, and SNRs as computed are delivered in sequence to a display unit 30, in which SNR values are displayed and output in the order of the respective frames, or graphs thereof are displayed.

For a regeneration unit for decoding the moving picture codes, such as the regeneration unit 20 and the reference moving picture decoder 120, there is either a case of using an integrated circuit built by integrating dedicated processing circuits or a case of using a decoding and regenerating software, called a moving picture player, capable of operation in conjunction with an all-purpose CPU (Central Processing Unit) and an all-purpose OS (Operating System) that are used in a personal computer or a work station (hereinafter referred to as computer). Further, there can also be an intermediate case between the aforesaid two cases, that is, a case where the integrated circuit is incorporated in the computer and the integrated circuit is caused to execute a part of processing while a CPU is caused to execute the rest of processing using the software.

In the regeneration unit described above, buffering of frames, equivalent in number to those for display for the duration of several seconds or longer, using a memory semiconductor, will impose a large load on the memory semiconductor in view of the circuit scale thereof because of massive information throughput of dot data. Also, a moving picture has a major feature in that there has to be an appropriate interval between display times of respective frames, and in case of considerable delay in processing time, smoothness in variation of an image can not be obtained, causing a practical problem of degradation in moving picture quality.

Accordingly, with the regeneration unit for regenerating moving picture codes corresponding to frames for the duration of about several seconds or longer, it is necessary to execute inputting, decoding, and outputting to the display unit of the moving picture codes with respect to each of the frames within permissible time limits.

Since a length of process time required for decoding varies widely depending on details of the moving picture codes, the input-time of the moving picture codes and the length of decoding. process time are important under conditions that output to the display unit needs to be effected by the permissible time limits.

In particular, in the case of inputting the moving picture codes via communications, congestion in a network, delay due to re-transmission, etc. and magnitude in fluctuation thereof will have non-negligible effect on arrival times of the moving picture codes. In such a case, it becomes more difficult to pre-design time for outputting the moving picture codes to the display unit due to both a factor of variation in time required for decoding and a factor of variation in input delay time of the moving picture codes.

Accordingly, in case that processing of the moving picture codes can not be completed in time, the regeneration unit takes a step of stopping displaying a frame being processed at that point in time. The step has an advantageous effect of preventing delay in processing from rippling through to subsequent frames, one after another, and keeps displaying the last normal frame for the duration of the step although for a brief period of time in order to suppress a feeling of unnaturalness that a user viewing the display unit gets. As a result, a picture appears to have stopped its movement, and therefore, a state in which the step is being taken is referred to as picture freeze. The frequency and so forth of the picture freeze is used for evaluation of the input delay and a decoding processing speed.

An example of the related art dealing with the evaluation of moving picture quality using the picture freeze is described in the paper under the title: "Issues on high presence video communication over international ATM networks" by Takahiro Komine, Ryutaro Suzuki, and Fumito Kubota (Communications Research Laboratory, Ministry of Posts and Telecommunications), Technical Report of IEICE, IN98-52, pp. 71–76, 1998, published by the Institute of Electronics, Information and Communication Engineers.

Figure 5:
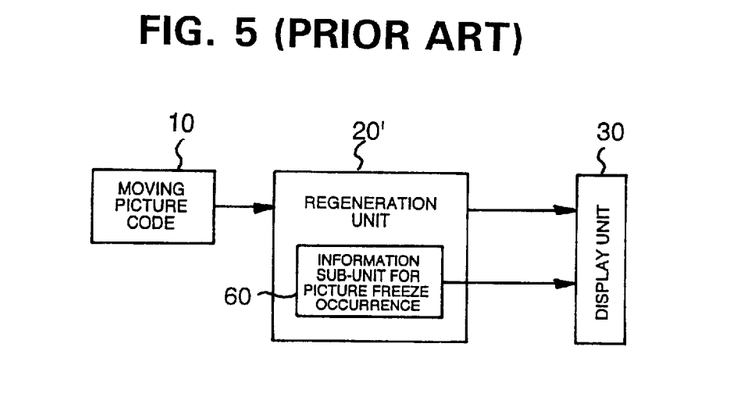
FIG. 5 is a block diagram showing an example of the configuration of another conventional moving picture regeneration analyzer using picture freeze.

FIG. 5 shows an example of the configuration of another conventional moving picture regeneration analyzer using the picture freeze. With this moving picture regeneration analyzer, a moving picture code 10 is decoded by a regeneration unit 20', and the regeneration unit 20' is provided with an information sub-unit for picture freeze occurrence 60, which outputs times of picture freeze occurrences and times of picture freeze termination to a display unit 30. And the display unit 30 displays and outputs the frequency of the picture freeze occurrence, time intervals between the picture freeze occurrences, times of picture freeze starts as well as picture freeze termination, and so forth, or displays graphs thereof.

Figure 6:
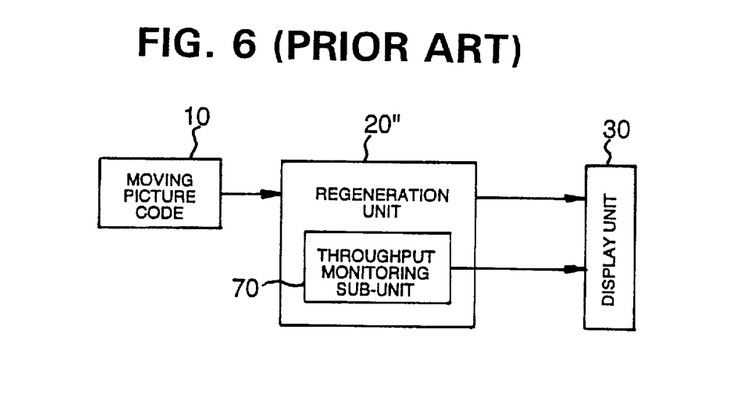
FIG. 6 is a block diagram showing an example of the configuration of still another conventional moving picture regeneration analyzer using a throughput.

Further, FIG. 6 shows an example of the configuration of still another conventional moving picture regeneration analyzer using a throughput. With this moving picture regeneration analyzer, a moving picture code 10 is decoded by a regeneration unit 20", and the regeneration unit 20" is provided with a throughput monitoring sub-unit 70, and the throughput monitoring sub-unit 70 counts the throughput of decoding executed by the regeneration unit 20". For example, the throughput monitoring sub-unit 70 counts a throughput of decoding by frame, and outputs the same to a display unit 30. The display unit 30 displays and outputs the throughput of respective frames in sequence, or displays graphs thereof.

Besides the aforementioned, the technique for analyzing the quality of digital moving picture data as received by use of the root mean square of the differential images and other moving picture analyzing means is disclosed in Japanese Patent Application No. Hei 9-216814 entitled "Motion Picture Communication Management System", filed by the applicant of the present invention.

Now the conventional moving picture regeneration analyzer described in the foregoing has drawbacks in the following respects from the viewpoint of finding out an appropriate method of improving moving picture quality because use is made of either a function of analyzing the SNR or a function of analyzing the picture freeze.

Since factors for determining the magnitude of the SNR are degradation due to data compression and deficiency due to transmission errors, there are available appropriate methods of ensuring excellent moving picture quality by coping with these factors, respectively. First, there is a method of causing the quantization step width adopted in the encoder to be rendered finer for achieving improvement on the degradation due to data compression. With the adoption of this method, a coding rate generally increases. However, an increase in the coding rate can be held down if a coding mode with high compression efficiency is adopted at the same time. Nevertheless, there is still a general tendency of a coding throughput being on the increase.

Meanwhile, for achieving improvement on the deficiency due to transmission errors, there are available a method of lessening the transmission errors, and a method of changing a coding mode so as to hold down the extent to which the transmission errors ripple through to images. The method of lessening the transmission errors includes a method of changing communications media, a method of mitigating congestion in a network by, for example, increasing the capacity of the network in the case of the transmission errors being attributable to the congestion in the network, and a method of securing sufficient lead time to enable retransmission by, for example, lowering a coding rate when the transmission errors occur. On the other hand, with a method of changing a coding mode, the coding mode that holds down the extent to which the transmission errors ripple through to images generally tends to lead to an increase in the coding rate.

Next, since factors for determining the frequency of the picture freeze occurrence are large fluctuations in input delay time and a slow processing speed as causes for preventing a decoding process from being completed in time, there are available appropriate methods of improvement to ensure excellent moving picture quality by coping with these factors, respectively.

In the case of large fluctuations in the input delay time, if fluctuations in transmission delay at a transmitter are large in magnitude, there is available a method of lessening the magnitude of such fluctuations, and if fluctuations in transmission time via a network are large, there is available a method of lessening the magnitude of such fluctuations through improvement on the network or a method of increasing the extent to which buffering of frames can be executed in the regeneration unit for moving picture.

On the other hand, in the case where a slow processing speed is one of the factors, there is available a method of increasing a processing speed of a dedicated integrated circuit when the dedicated integrated circuit is used for decoding while there is available a method of raising processing efficiency by optimizing the decoding and regenerating software or by increasing the processing speed of the all-purpose CPU when the all-purpose CPU and the software are used in the computer, and there is also available a method whereby other processing is suspended or lightened when the other processing is being executed concurrently.

There is also a method of reducing the scale of a decoding process by lessening resolution and a frame rate (the number of frames processed per a unit time) associated with an image specification for coding in the encoder, or by changing a coding mode into one requiring a lower throughput. In the case of adopting the coding mode requiring a lower throughput, however, the coding rate generally goes up.

Thus, since there can be cases where the methods for improvement by changing encoding, modifying the network, changing the regeneration unit for moving picture, and so forth will have conflicting effects on the SNR and the picture freeze, the effects thereof on both the SNR and the picture freeze need to be evaluated in order to resolve which one of the methods is to be adopted. Further, the input delay and the processing speed need to be evaluated as well in order to find out the causes of the picture freeze.

With the conventional moving picture regeneration analyzer, however, either one of the analytical functions has been used independently, thus posing a problem that such practice is not satisfactory from the point of finding out an appropriate method of improving picture quality. It is therefore required that an appropriate method of improving picture quality be ascertained by finding out a solution to this problem.

In addition to the problem described hereinbefore, the following problem needs to be dealt with.

Since a large processing scale and a wide transmission band are required in the conventional usage of a moving picture, there has often been a limitation that one picture at the maximum can be put to use at a time, however, the example as recommended by MPEG-4 (ISO/IEC-14496) described in the foregoing includes an application wherein two or more pictures synchronized with each other are utilized concurrently.

Figure 3:
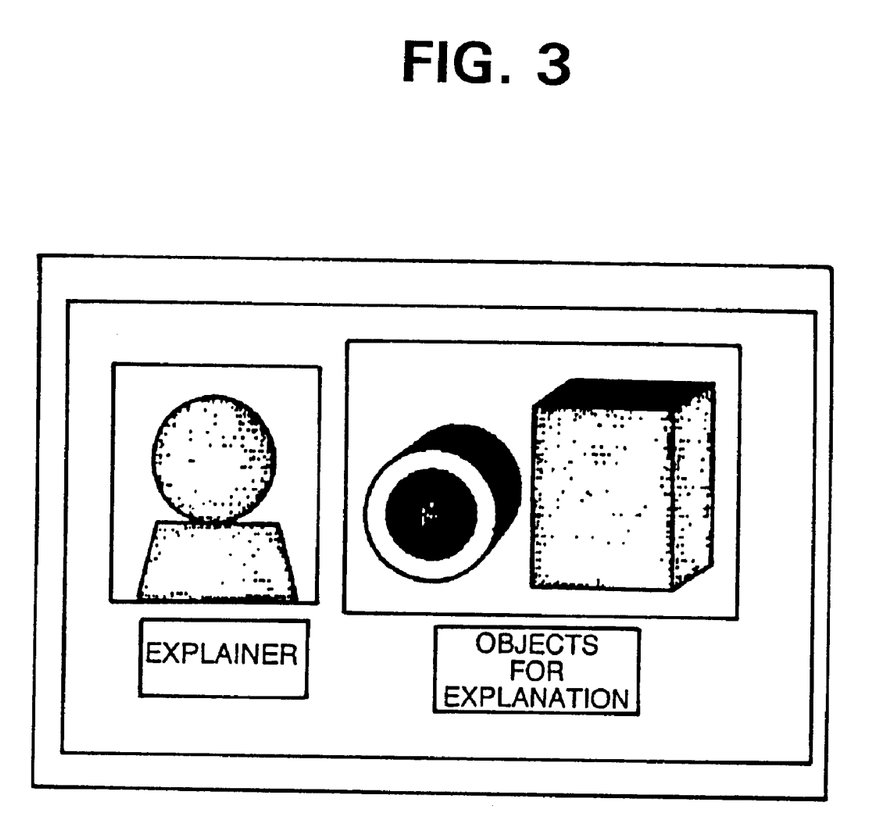
FIG. 3 is a view illustrating an application example of a moving picture as the object of analysis by the analytical system for moving picture regeneration.

FIG. 3 illustrates an application example showing concurrent display of a plurality of pictures, wherein two pictures, one of an explainer and the other of objects for explanation are displayed. For example, inthe case of moving picture contents explaining about a moving body, there is a form of application wherein a user can get an explanation about the moving object along with expressions on the face of, and the actions of the explainer by regenerating and displaying a picture of the moving object synchronized with a picture showing the image of the explainer in such a way as intended by the producer of the moving picture contents.

Now, in terminology relating to MEPG-4, coded objects such as objects for explanation, an explainer, and so forth are referred to as a video object (Video Object), respectively, and the term, a plane (or VOP: Video Object Plane), is used for an instantaneous image of respective video objects. Besides a case where an independent rectangular picture is made up of respective video objects, there are cases where a plurality of video objects are synthesized and displayed on a single rectangular picture. For the sake of brevity to avoid complexity resulting from writing down a number of similar terms side by side, it is defined hereinafter that the term "picture" includes the video objects as well, and the term "frame" includes the plane (VOP) as well.

A problem encountered in usage of a plurality of moving pictures through synchronization and regeneration is as follows. Since the processing speed of the computer and the like has limitations, it is whether or not decoding processes of all the pictures can be completed totally in time that matters, and if not, the picture freeze occurs on any of unspecified pictures. Accordingly, as it is impossible to find out determinants through evaluation of the picture freeze and the throughput in relation to respective pictures only, there will arise need for collating a sum of decoding throughputs for all the pictures with the state of the picture freeze occurrence with respect to all the pictures.

Notwithstanding such requirement, with the conventional moving picture regeneration analyzer, the analytical function thereof is used for either the picture freeze or the throughput, independently from each other, as described in the foregoing. In addition, each of the pictures is evaluated independently. Therefore, in the case of concurrently displaying the plurality of pictures, the conventional moving picture regeneration analyzer has a problem that it is quite inadequate to find out an appropriate method of improving moving picture quality. Thus, there is need for ascertaining an appropriate method of improving moving picture quality even in the case of concurrently displaying the plurality of pictures by solving the problem described above.

SUMMARY OF THE INVENTION

In light of the circumstances described above, the present invention has been developed, and an object of the invention is to provide an analytical system for moving picture regeneration, capable of performing satisfactory analysis of the regeneration condition of a moving picture and ascertaining an appropriate method of improving moving picture quality.

Further, it is another object of the invention to provide an analytical system for moving picture regeneration, even in the case of concurrently regenerating a plurality of moving pictures, that is capable of performing satisfactory analysis of the regeneration condition of the plurality of moving pictures and ascertaining an appropriate method of improving moving picture quality.

To achieve the above object, the analytical system for moving picture regeneration of the invention has the following characteristics.

The analytical system for moving picture regeneration according to a first aspect of the invention comprises moving picture regeneration means of decoding and regenerating a moving picture code inputted, detecting means of detecting occurrence of picture freeze of a moving picture decoded and regenerated by the moving picture regeneration means, means of converting a differential between the moving picture and a reference moving picture into numbers, and means of outputting and displaying concurrently the state of the occurrence of the picture freeze and the differential converted in numbers.

The analytical system for moving picture regeneration according to a second aspect of the invention is characterized in further comprising, in addition to the means of the first aspect of the invention, delay time detection means of detecting an amount of delay in input time of the moving picture code to be delivered to the moving picture regeneration means, and means of outputting and displaying the characteristic of change over time of the amount of delay detected by the delay time detection means.

The analytical system for moving picture regeneration according to a third aspect of the invention is characterized in that the moving picture regeneration means of the first aspect of the invention comprises throughput detection means of detecting a throughput for decoding and regenerating the moving picture code, and means of outputting and displaying the characteristic of change over time of the throughput detected by the throughput detection means.

An analytical system for moving picture regeneration according to a fourth aspect of the invention comprises moving picture regeneration means of concurrently decoding and regenerating a plurality of moving picture codes inputted, respectively, detection means of detecting occurrence of picture freeze of respective moving pictures decoded and regenerated by the moving picture regeneration means, means of converting a differential between the respective moving pictures and respective reference moving pictures into numbers, and means of outputting and displaying concurrently the state of the occurrence of the respective picture freezes and the respective differentials converted in numbers.

The analytical system for moving picture regeneration according to a fifth aspect of the invention is characterized in further comprising, in addition to the means of the fourth aspect of the invention, delay time detection means of detecting an amount of delay in input-time of the respective moving picture codes to be delivered to the moving picture regeneration means, and means of outputting and displaying the characteristics of change over time of the amount of respective delays detected by the delay time detection means.

The analytical system for moving picture regeneration according to a sixth aspect of the invention is characterized in that the moving picture regeneration means of the fourth aspect of the invention comprises throughput detection means of detecting a throughput for decoding and regenerating the respective moving picture codes, and means of outputting and displaying the characteristic of change over time of the respective throughputs detected by the throughput detection means.

The analytical system for moving picture regeneration according to sixth aspect of the invention is characterized in that the moving picture regeneration means of the fourth aspect of the invention comprises a total throughput detection means of detecting a total throughput for decoding and regenerating all of the plurality of the moving picture codes, and means of outputting and displaying the characteristic of change over time of the total throughput detected by the total throughput detection means.

DESCRIPTION OF THE PREFERRED EMBODIMENT

An embodiment of the invention is described hereinafter with reference to the accompanying drawings.

Figure 1:
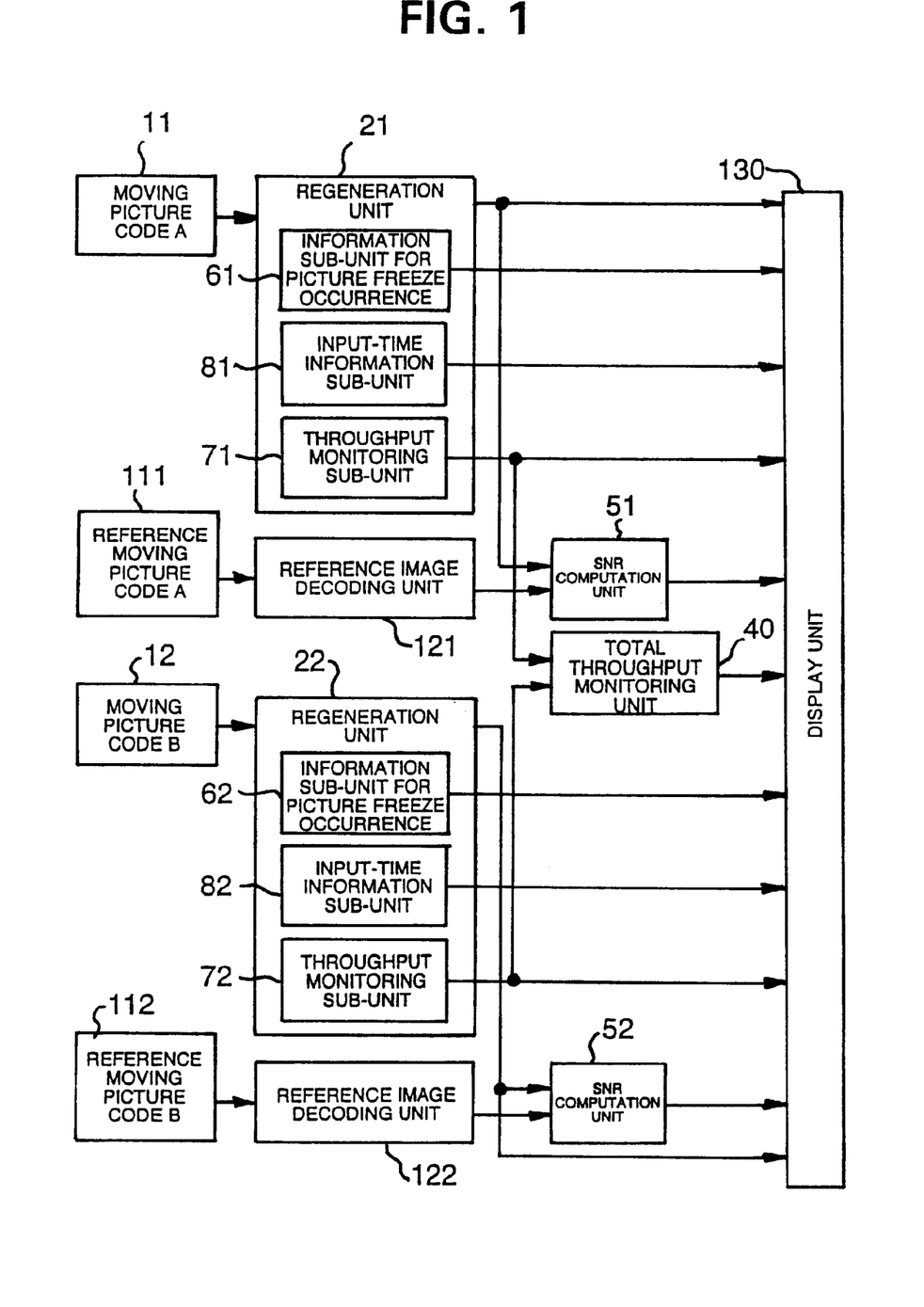
FIG. 1 is a block diagram showing the configuration of an embodiment of an analytical system for moving picture regeneration according to the invention.

FIG. 1 is a block diagram showing the configuration of the embodiment of an analytical system for moving picture regeneration according to the invention.

In FIG. 1, reference numerals 11, 12 are moving picture codes fetched from predetermined memory media, or transmitted via predetermined communications media, to be continuously fed in sequence to the analytical system for moving picture regeneration, and the moving picture codes 11, 12 are delivered to regeneration units 21, 22, respectively.

The regeneration units 21, 22 are moving picture regeneration means for decoding and regenerating the moving picture codes 11, 12, respectively. These regeneration units described may be built by use of a computer having an all-purpose CPU and decoding and regeneration software, by use of a dedicated semiconductor circuit, or by joint use of them. To take an example of the moving picture shown in FIG. 3, the regeneration unit 21 regenerates a picture of bodies as the object for explanation from the moving picture code 11, and the regeneration unit 22 regenerates a picture of an explainer from the moving picture code 12.

The regeneration units 21, 22 are provided with information sub-units for picture freeze occurrence, 61, 62, respectively. The information sub-units for picture freeze occurrence, 61, 62, detect occurrence and termination of a picture freeze taking place during a decoding process in the regeneration units 21, 22, respectively, and outputs times thereof (occurrence time and termination time) as freeze data.

The regeneration units 21, 22 are also provided with input-time information sub-units 81, 82, respectively. The input-time information sub-units 81, 82 detect delay of the moving picture codes 11, 12 delivered to the regeneration units 21, 22, respectively, and output detected delays as delay data. Such detection of delay may be executed in accordance with, for example, MPEG-2 described in the foregoing, whereby moving picture codes with time for decoding embedded therein are transmitted while a clock is installed in the regeneration units, respectively, so that an amount of delay (delay time) is computed by comparing input-times of the moving picture codes with times indicated by the clock.

Further, the regeneration units 21, 22 are provided with throughput monitoring sub-units 71, 72, respectively. The throughput monitoring sub-units 71, 72 detect and output a throughput of the regeneration units 21, 22, respectively. For example, a throughput for each of the frames is counted in sequence, respectively, and the throughput of respective frames is sent out in sequence.

Reference numerals 111, 112 represent reference moving picture codes obtained by coding the same images as coded by the moving picture codes 11, 12 with the use of different coding parameters. For example, in the case of the moving picture codes 11, 12 being moving picture codes coded at a coding rate of 128 kbits/s, moving picture codes coded at a coding rate of 6 Mbits/s are used as the reference moving picture codes 111, 112, respectively. The reference moving picture codes 111, 112 are also fetched from the predetermined memory media, or transmitted via the predetermined communications media, so as to be continuously fed in sequence to the analytical system for moving picture regeneration, and are delivered to reference image decoding units 121, 122, respectively.

The reference image decoding units 121, 122 are reference moving picture regeneration means for decoding and regenerating the reference moving picture codes 111, 112, respectively.

Reference numerals 51, 52 denote SNR computation units for converting a differential between the moving picture codes 11, 12 and the reference moving picture codes 111, 112, respectively, into numbers, wherein such conversion is executed by inputting therein restored moving pictures decoded and regenerated at the regeneration units 21, 22, respectively, and reference moving pictures decoded and regenerated at the reference image decoding units 121, 122, respectively, and by executing mathematical operation or the like to find differentials between respective dot data of the respective moving pictures. For example, a ratio of the root mean square of the tone values of the pixels of the reference moving picture to the root mean square of the tone values of respective pixels of a differential image (an image composed of pixels obtained by deducting the tone value of respective pixels of a restored moving picture from that of respective pixels of the reference moving picture, corresponding to the respective pixels of the former) is first taken, and by multiplying the logarithm to the base 10 of the ratio by a factor of 10, a SNR value expressed in terms of dB (decibel) is obtained.

In this connection, three or more moving picture codes such as denoted by Code C, Code D, and so on following the moving picture codes 11, 12 (Code A, Code B) shown in FIG. 1 may be used. In such a case, it is easy to provide a configuration comprising analytical functions corresponding to each of these moving picture codes. That is, it is sufficient to install additionally a regeneration unit, similar to the one described above, incorporating an information sub-unit for picture freeze occurrence, an input-time information sub-unit, and a throughput monitoring sub-unit, together with a reference image decoding unit and a SNR computation unit to correspond to each additional moving picture code while reference moving picture codes corresponding to the additional moving picture codes are supplied, respectively.

A reference numeral 40 denotes a total throughput monitoring unit for outputting a sum of outputs of the throughput monitoring sub-units 71 and 72. The total throughput monitoring unit 40 may be for detecting a total throughput of the regeneration units 21 and 22, respectively, and outputting the same by frame or by time interval subdivided.

A reference numeral 130 denotes a display unit, and the display unit 130 is for receiving an output of the SNR computation units 51, 52, the information sub-units for picture freeze occurrence 61, 62, the throughput monitoring sub-units 71, 72, the input-time information sub-units 81, 82, and the total throughput monitoring unit 40, respectively, thereby performing display of tables and graphs, outputting to other computers, and so forth, on the basis of such outputs as described.

With such a configuration as described, when the moving picture codes 11, 12 and the reference moving picture codes 111, 112 are supplied, respectively, and delivered to the regeneration units 21, 22 and the reference image decoding units 121, 122, respectively, the decoding process of respective moving picture codes is executed. At this point in time, in case that the picture freeze occurs in the regeneration units 21, 22 during the respective decoding process, occurrence as well as termination thereof is detected by the information sub-units for picture freeze occurrence 61, 62, respectively, and times of the occurrence as well as the termination are delivered to the display unit 130 as freeze data. Also delay of the moving picture codes 11, 12 inputted are detected by the input-time information sub-units 81, 82, respectively, delay data are sent out to the display unit 130, and throughputs as detected by the throughput monitoring sub-units 71, 72, respectively, are delivered to the display unit 130 and the total throughput monitoring unit 40.

When the moving picture codes 11, 12 decoded by the regeneration units 21, 22, respectively, and the reference moving picture codes 111, 112 decoded by the reference image decoding units 121, 122, respectively, are sent out to the SNR computation units 51, 52, respectively, a differential between the moving picture codes 11, 12 and the reference moving picture codes 111, 112, respectively, is converted into numbers, and respective SNR values are delivered to the display unit 130. Then respective throughputs of the regeneration units 21, and 22 are summed up by the total throughput monitoring unit 40, and a total throughput is delivered to the display unit 130.

Thereupon, the display unit 130 is supplied with the state of the picture freeze occurrence, the input delay, and the throughputs of the regeneration units 21, 22, respectively, and the SNR values of the moving picture codes 11, 12, respectively. At the same time, the display unit 130 is also supplied with the total throughput of both the regeneration units 21 and 22, that is, all the throughputs of constituent units having processing resources in common.

Figure 2:
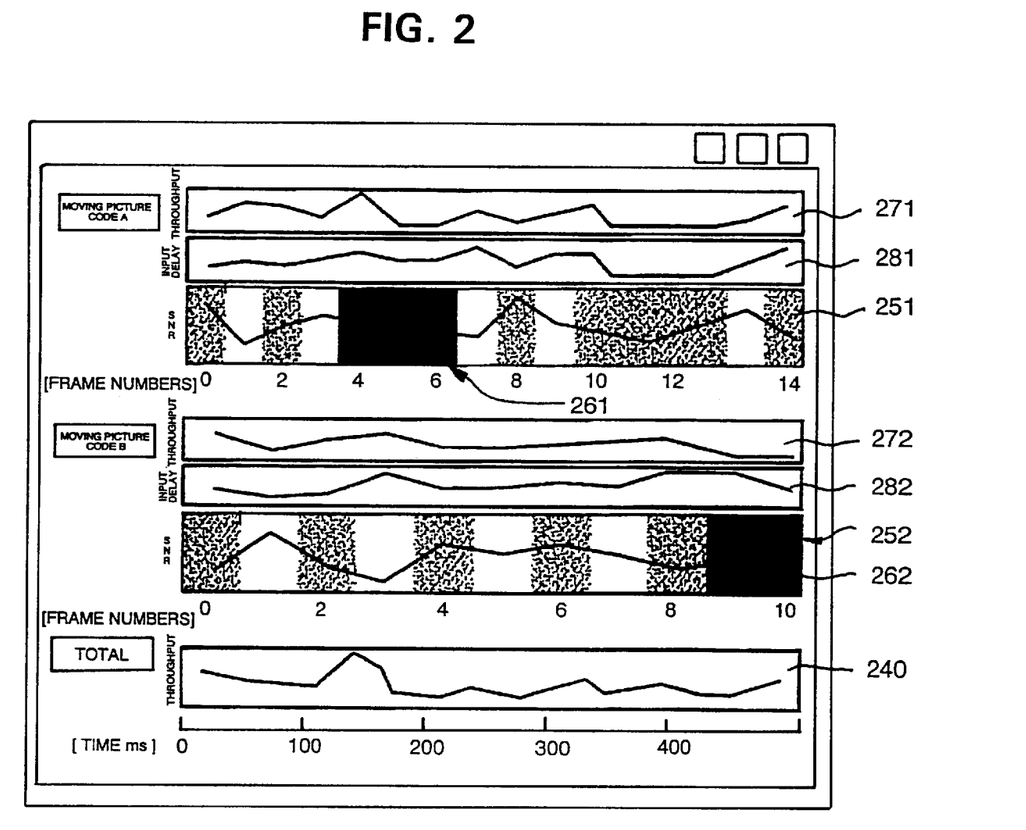
FIG. 2 is a view showing, by way of example, a form of display at a display unit 130 of the embodiment of the analytical system for moving picture regeneration according to the invention.

The display unit 130 performs predetermined display, output to the outside, and so forth on the basis of such information as supplied There are conceivable the display and the output that can be performed in various forms, but one example thereof is taken and described hereinafter. FIG. 2 is a view showing an example of display at the display unit 130.

In FIG. 2, there are shown SNR graphs 251, 252, indicating change over time of SNR values, picture freeze occurrence displays 261, 262, indicating the state of picture freeze occurrence, throughput graphs 271, 272, indicating change over time of the throughput, input delay graphs 281, 282, indicating change over time of input delays, and a total throughput graph 240 indicating change over time of the total throughput. Incidentally, the rear end number (either 1 or 2) of the reference numerals in FIG. 2 except 240 signifies display (with reference to either the moving picture code A or B) provided on the basis of the output from respective units shown in either upper part or lower part in FIG. 1, on the left side thereof.

It is easier to comprehend the total throughput graph 240 if a timeaxis with a unit time in the order of 10 to 100 ms is adopted for the horizontal axis thereof as shown in the figure while it is easier to comprehend graphs related to the moving picture codes 11, 12, respectively, other than the reference numeral 240, if frame numbers are adopted as a unit for the horizontal axis thereof as shown in the figure.

In FIG. 2, the picture freeze occurrence displays 261, 262 are displayed by superimposing the same over the SNR graphs 251, 252. More specifically, portions of the SNR graphs 251, 252, displayed in the identical mode (in the identical density in this case) over a plurality of frames, represent spots where picture freezes have occurred However, such a form of display as described above is nothing but an example, and the picture freeze occurrence displays 261, 262 may be displayed by superimposing the same over the input delay graphs 281, 282 or over the throughput graphs 271, 272.

Next, an application method of the system in the case of the example of the display shown in FIG. 2 is described hereinafter.

As for the SNR, for example, a guide for the SNR values is set up beforehand, and if the SNR value of the SNR graphs 251, 252, respectively, are smaller than the guide, that is, a difference of the differential image from the reference moving picture is greater, a degree of degradation due to data compression is higher. Therefore, the quantization step width in encoders is rendered finer in such a case. With a resultant increase in the coding rate, however, a countermeasure is decided upon by evaluating the effects of selecting a coding mode, lowering resolution or a frame rate, enlarging a bandwidth of the network, and so forth. If the compression ratio is high, a degree of the ripple effect of image deficiency due to transmission errors will become greater depending on the coding mode, thus precluding improvement on the SNR.

Next, if the frequency of picture freeze occurrence is found to exceed the maximum permissible limit on the basis of the picture freeze occurrence displays 261, 262, a decision on whether fluctuations in the input delay are large in magnitude or the throughput is excessive at the time when the picture freeze occurs is made on the basis of the input delay graphs 281, 282, and the throughput graphs 271, 272. In the case of large fluctuations in the input delay, improvement on a system of transmission from the encoders and improvement on the network are needed. In the case of congestion in the network being the cause of excessive occurrence of the picture freeze, the coding rate may be reduced. However, if the coding rate is reduced by rendering the quantization step width coarser, degradation due to data compression becomes greater in magnitude. Accordingly, a decision on reduction in the coding rate is made by evaluating the SNR values on the basis of the SNR graphs 251, 252. There are also available other methods such as a method of selecting a coding mode, a method of lowering resolution or a frame rate, and so forth.

Since the throughput is related to processing executed by all the other constituent units having the same processing resources in common, evaluation thereof is carried out after suspending other processing being executed in parallel Further, in the case of decoding and displaying a plurality of pictures concurrently, a sum of decoding processes is related to the picture freeze. Accordingly, if the picture freeze is found related to the total throughput by evaluating a correlation between the total throughput and the picture freeze occurrence on the basis of the total throughput graph 240 and the picture freeze occurrence displays 261, 262, the total throughput needs to be reduced by increasing a processing speed, or by lowering the resolution or the frame rate.

Thus, through analysis by use of the graphs illustrated in the example of display shown in FIG. 2 and so forth, it becomes feasible to tune up the encoders, the network, a moving picture regeneration system so as to meet the conditions that the frequency of the picture freeze occurrence is not higher than the maximum permissible limit without causing the SNR values to become lower than the permissible limits.

As described in the foregoing, the analytical system for moving picture regeneration according to the invention is capable of detecting the occurrence of the picture freeze upon decoding and regeneration of the moving picture code, converting a differential between the moving picture decoded and regenerated and a reference moving picture into numbers, and concurrently outputting and displaying the state of the occurrence of the picture freeze and the differential as converted in numbers, so that the quality of the moving picture can be evaluated on the basis of both the picture freeze and the differential represented by the SNR and so forth at the same time. This enables the analytical system for moving picture regeneration according to the invention to have an advantageous effect that an appropriate method of improving the moving picture quality can be ascertained.

In accordance with a second aspect of the invention, an amount of delay in input-time of the moving picture code is detected and the characteristic of change over time of the amount of delay is outputted and displayed, so that analysis of input delay can be executed at the same time. This enables the analytical system for moving picture regeneration according to the invention to have another advantageous effect that an appropriate method of improving the moving picture quality can be ascertained with greater accuracy.

Further, in accordance with a third aspect of the invention, a throughput for decoding and regenerating the moving picture code is detected, and the characteristic of change over time of the throughput is outputted and displayed, so that analysis of the throughput as well can be executed at the same time. This enables the analytical system for moving picture regeneration according to the invention to have a further advantageous effect that an appropriate method of improving the moving picture quality can be ascertained with still greater accuracy.

Thus, according to the invention, the moving picture quality is evaluated with respect to both the picture freeze and the SNR, and the like, concurrently, and analysis of determinants for the input delay and the throughput is also executed at the same time. Accordingly, the invention has a still further advantageous effect that it becomes possible to resolve which of, for example, change of encoding, improvement on the network, and improvement on the moving picture regeneration unit is an appropriate method of improvement.

Meanwhile, in accordance with a fourth aspect of the invention, occurrence of picture freeze upon decoding and regeneration of a plurality of moving picture codes, respectively, is detected, a differential between respective moving pictures decoded and regenerated, and respective reference moving pictures, is converted into numbers, and the state of the occurrence of the respective picture freezes and the respective differentials converted in numbers are outputted and displayed concurrently, so that the quality of the moving pictures can be concurrently evaluated with respect to the picture freeze of a plurality of moving pictures and the differentials represented by the SNRs and the like. This enables the invention to have an advantageous effect that an appropriate method of improving the quality of the moving pictures can be ascertained even in the case of concurrently regenerating the plurality of the moving pictures.

In accordance with a fifth aspect of the invention, an amount of delay in input time of each of a plurality of moving picture codes is detected and the characteristic of change over time of the amount of respective delays is outputted and displayed, so that analysis of input delay with respect to the plurality of moving picture codes can be executed concurrently. This enables the invention to have another advantageous effect that it becomes possible to ascertain an appropriate method of improving the quality of the moving pictures with greater accuracy even in the case of concurrently regenerating the plurality of the moving pictures.

Further, in accordance with a sixth aspect of the invention, a throughput for decoding and regenerating each of a plurality of moving picture codes is detected, and the characteristic of change over time of respective throughputs is outputted and displayed, so that analysis of the throughput with respect to the plurality of moving picture codes can be executed concurrently. This enables the invention to have an advantageous effect that it becomes possible to ascertain an appropriate method of improving the quality of the moving pictures with still greater accuracy even in the case of concurrently regenerating the plurality of the moving pictures.

And in accordance with a seventh aspect of the invention, a total throughput for decoding and regenerating all of a plurality of the moving picture codes is detected, and the characteristic of change over time of the total throughput is outputted and displayed, so that analysis of the throughputs for all of the plurality of the moving picture codes can be executed concurrently. This enables the invention to have a further advantageous effect that it becomes possible to ascertain an appropriate method of improving the quality of the moving pictures with further greater accuracy even in the case of concurrently regenerating the plurality of pictures.

Thus, according to the invention, in concurrently regenerating a plurality of pictures, since a sum of the throughputs for decoding processes are concurrently analyzed, determinants for picture freeze can be identified. Therefore, as described in the foregoing, the invention can have an advantageous effect that it becomes possible to resolve which of, for example, change of encoding, improvement on the network, and improvement on the moving picture regeneration unit is an appropriate method of improvement.

What is claimed is:

1. An analytical system for moving picture regeneration comprising:

moving picture regeneration means for decoding and regenerating a moving picture code input;

detecting means for detecting occurrence of picture freeze of a moving picture decoded and regenerated by the moving picture regeneration means;

means for converting a differential between the moving picture and a reference moving picture into numbers;

means for outputting and displaying concurrently a state of the occurrence of the picture freeze and the differential converted into numbers;

delay time detection means for detecting an amount of delay in input time of the moving picture code to be delivered to the moving picture regeneration means; and means for outputting and displaying a characteristic of change over time for the amount of delay detected by the delay time detection means.

2. The analytical system for moving picture regeneration according to claim 1, wherein the moving picture regeneration means comprises throughput detection means for detecting a throughput for decoding and regenerating the moving picture code.

3. An analytical system for moving picture regeneration comprising:

moving picture regeneration means for concurrently decoding and regenerating a plurality of moving picture codes input;

detection means for detecting occurrence of picture freeze of respective moving pictures decoded and regenerated by the moving picture regeneration means;

means for converting a differential between the respective moving pictures and respective reference moving pictures into numbers;

means for outputting and displaying concurrently a state of the occurrence of the respective picture freezes and the respective differentials converted in numbers;

delay time detection means for detecting an amount of delay in input time of the respective moving picture codes to be delivered to the moving picture regeneration means; and means for outputting and displaying characteristics of change over time for the amount of respective delays detected by the delay time detection means.

4. The analytical system for moving picture regeneration according to claim 3, wherein the moving picture regeneration means comprises throughput detection means for detecting a throughput for decoding and regenerating the respective moving picture codes.

5. An analytical system for moving picture regeneration comprising:

moving picture regeneration means including a total throughput detection means for detecting a total throughput for concurrently decoding and regenerating all of a plurality of moving picture codes input;

detection means for detecting occurrence of picture freeze of respective moving pictures decoded and regenerated by the moving picture regeneration means;

means for converting a differential between the respective moving pictures and respective reference moving pictures into numbers;

means for outputting and displaying concurrently a state of the occurrence of the respective picture freezes and the respective differentials converted in numbers; and means for outputting and displaying the characteristic of change over time of the total throughput detected by the total throughput detection means.

\* \* \* \* \*